United States Patent
Shimogaki

(10) Patent No.: US 12,528,376 B2
(45) Date of Patent: Jan. 20, 2026

(54) VEHICLE AND POWER MANAGEMENT SYSTEM

(71) Applicant: TOYOTA JIDOSHA KABUSHIKI KAISHA, Toyota (JP)

(72) Inventor: Yusuke Shimogaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 744 days.

(21) Appl. No.: 17/970,281

(22) Filed: Oct. 20, 2022

(65) Prior Publication Data
US 2023/0128750 A1 Apr. 27, 2023

(30) Foreign Application Priority Data
Oct. 25, 2021 (JP) .................. 2021-173726

(51) Int. Cl.
*H02J 7/00* (2006.01)
*B60L 53/62* (2019.01)
*B60L 53/66* (2019.01)

(52) U.S. Cl.
CPC .............. *B60L 53/62* (2019.02); *B60L 53/66* (2019.02); *H02J 7/0047* (2013.01); *H02J 7/00712* (2020.01)

(58) Field of Classification Search
CPC ...... B60L 53/62; H02J 7/00712; H02J 7/0047
See application file for complete search history.

(56) References Cited

U.S. PATENT DOCUMENTS

2019/0160955 A1* 5/2019 Yang ................. B60L 53/60
2021/0008993 A1 1/2021 Kuboyama

FOREIGN PATENT DOCUMENTS

WO 2020115821 A1 6/2020

* cited by examiner

*Primary Examiner* — Robert Grant
(74) *Attorney, Agent, or Firm* — Dinsmore & Shohl LLP

(57) ABSTRACT

A vehicle is configured to perform charging/discharging between an EVPS and the vehicle via a vehicle inlet. The vehicle includes an ECU that controls charging/discharging of the vehicle, and a control signal circuit including at least one control signal line connected between the vehicle inlet and the ECU. The control signal circuit includes a compatible circuit for ensuring compatibility of a control signal transmitted through the at least one control signal line between the EVPS and the ECU, and an isolating element of capacitive coupling type or magnetic coupling type electrically isolating the compatible circuit from the ECU.

20 Claims, 7 Drawing Sheets

VEHICLE AND POWER MANAGEMENT SYSTEM

CROSS REFERENCE TO RELATED APPLICATIONS

This nonprovisional application claims priority to Japanese Patent Application No. 2021-173726 filed on Oct. 25, 2021 with the Japan Patent Office, the entire contents of which are hereby incorporated by reference.

BACKGROUND

Field

The present disclosure relates to a vehicle and a power management system, and more particularly, to a vehicle configured to perform charging/discharging between a power facility and the vehicle, and a power management system including the vehicle.

Background Art

In recent years, vehicles including an onboard secondary battery and/or an onboard generator, such as battery electric vehicles, plug-in hybrid electric vehicles, or fuel cell electric vehicle, have become widespread. Such vehicles are charged with electric power supplied from a power facility (charging facility). For example, WO 2020/115821 discloses a charging system including a vehicle and a charger.

As renewable energy has become widespread, such a technique is proposed that uses a vehicle in peak shift and peak cut for electric power in a system power supply. Discharging (feeding) from a vehicle to interior wiring is also referred to as V2H (Vehicle to Home), and discharging from the vehicle to an electrical power grid is also referred to as V2G (Vehicle to Grid).

SUMMARY

In the charging system disclosed in WO 2020/115821, the vehicle and the charger are connected by a cable. The cable includes first and second charging start/stop lines 40a, 40b used to transmit a signal indicating start/stop of charging from the charger to the vehicle (see FIG. 2 of WO 2020/115821). Photocouplers 10c, 10d are connected to the respective vehicle-sides of first and second charging start/stop lines 40a, 40b. As a current flows through the photocoupler, a light emitting element in the photocoupler emits light, and a light receiving element receives the light and converts it into an electric signal. Thus, the electric signal is transmitted.

Particularly in the use of a vehicle for V2H or V2G, the vehicle and the power facility may remain connected for a long period of time. Commonly, the photocoupler consumes less power. However, the amount of power consumption obtained by adding up the power consumption of the photocoupler for a long period of time may be too large to ignore.

The present disclosure has been made to solve the above-mentioned problem. An object of the present disclosure is to reduce power consumption associated with transmission of a control signal between a power facility and a vehicle.

(1) A vehicle according to an aspect of the present disclosure is configured to perform charging/discharging between a power facility and the vehicle via a vehicle inlet. The vehicle includes a controller that controls charging/discharging of the vehicle, and a control signal circuit including at least one control signal line connected between the vehicle inlet and the controller. The control signal circuit includes a compatible circuit for ensuring compatibility of a control signal transmitted through the at least one control signal line between the power facility and the controller, and an isolating portion of capacitive coupling type or magnetic coupling type electrically isolating the compatible circuit from the controller.

(2) The at least one control signal line includes a first actuation start/stop line connected to a voltage level of a control power supply of the power facility via a first switch, and a second actuation start/stop line connected to ground via a second switch. The isolating portion includes a first isolating element electrically connected to the first actuation start/stop line via the compatible circuit, and a second isolating element electrically connected to the second actuation start/stop line via the compatible circuit.

(3) Each of the first isolating element and the second isolating element is a digital isolator configured to transmit an AC signal from a primary side to a secondary side of each isolating element while galvanically isolating the primary side from the secondary side.

(4) The compatible circuit includes a first resistor electrically connected between the first actuation start/stop line and the second actuation start/stop line, a second resistor electrically connected between the first actuation start/stop line and the ground, and a third resistor. The third resistor has a first end electrically connected to the first actuation start/stop line, and a second end. The compatible circuit further includes a switch electrically connected between the second end of the third resistor and the ground and being turned on and off according to a voltage level of the second actuation start/stop line.

(5) The switch includes a first transistor. The first transistor includes a first terminal that is an emitter or a source electrically connected to the second end of the third resistor, a second terminal that is a collector or a drain electrically connected to the ground, and a third terminal that is a base or a gate electrically connected to the second actuation start/stop line. The compatible circuit further includes a fourth resistor electrically connected between the first terminal and the second terminal of the first transistor.

(6) The compatible circuit further includes a first attenuation circuit electrically connected to the first actuation start/stop line, and a second attenuation circuit electrically connected to the second actuation start/stop line via the first resistor and the third resistor.

(7) The at least one control signal line includes a charging/discharging connector connection check line through which a control signal for checking connection of a charging/discharging connector to the vehicle inlet is transmitted. The isolating portion includes a third isolating element electrically connected to the charging/discharging connector connection check line via the compatible circuit.

(8) The compatible circuit further includes a fifth resistor that pulls up an electric potential of the charging/discharging connector connection check line to a voltage of an auxiliary battery, and a third attenuation circuit electrically connected to the charging/discharging connector connection check line.

(9) The at least one control signal line includes an actuation permission/prohibition line through which a control signal for notifying permission or prohibition of charging/discharging of the vehicle is transmitted. The isolating portion incudes a fourth isolating element of capacitive coupling type or magnetic coupling type electrically connected to the actuation permission/prohibition line via the compatible circuit.

(10) The compatible circuit includes a second transistor. The second transistor has a first terminal that is an emitter or a source, a second terminal that is a collector or a drain electrically connected to ground, and a third terminal that is a base or a gate. The compatible circuit further includes a sixth resistor electrically connected between the actuation permission/prohibition line and the second terminal of the second transistor, and a seventh resistor electrically connected between the third terminal of the second transistor and the fourth isolating element.

(11) A power management system according to another aspect of the present disclosure includes the vehicle described above and the power facility. The power facility includes an isolating element of capacitive coupling type or magnetic coupling type connected to the actuation permission/prohibition line.

(12) The at least one control signal line includes a first low-voltage auxiliary feeding circuit line connected to a voltage level of an auxiliary power supply of the power facility via a third switch, and a second low-voltage auxiliary feeding circuit line connected to the voltage level of the auxiliary power supply via a fourth switch. The isolating portion includes a fifth isolating element electrically connected to the first low-voltage auxiliary feeding circuit line via the compatible circuit, and a sixth isolating element electrically connected to the second low-voltage auxiliary feeding circuit line via the compatible circuit.

(13) The compatible circuit includes an eighth resistor electrically connected between the first low-voltage auxiliary feeding circuit line and ground, a fourth attenuation circuit electrically connected between the first low-voltage auxiliary feeding circuit line and the fifth isolating element, a ninth resistor electrically connected between the second low-voltage auxiliary feeding circuit line and the ground, and a fifth attenuation circuit electrically connected between the second low-voltage auxiliary feeding circuit line and the sixth isolating element.

(14) The at least one control signal line includes a first charging/discharging connector connection check line through which a control signal for checking connection of a charging/discharging connector to the vehicle inlet is transmitted. The isolating portion includes a seventh isolating element electrically connected to the first charging/discharging connector connection check line via the compatible circuit.

(15) The compatible circuit further includes a tenth resistor that pulls up an electric potential of the first charging/discharging connector connection check line to a voltage of an auxiliary battery, an eleventh resistor electrically connected between the first charging/discharging connector connection check line and ground, and a sixth attenuation circuit electrically connected between the first charging/discharging connector connection check line and the seventh isolating element.

(16) A power management system according to another aspect of the present disclosure incudes the vehicle described above and the power facility. The at least one control signal line includes a second charging/discharging connector connection check line through which a control signal for checking connection of the charging/discharging connector to the vehicle inlet is transmitted. The power facility includes an eighth isolating element of capacitive coupling type or magnetic coupling type connected to the second charging/discharging connector connection check line via the compatible circuit.

(17) The power facility further includes a twelfth resistor that pulls up an electric potential of the second charging/discharging connector connection check line to a voltage of the auxiliary power supply, and a seventh attenuation circuit electrically connected between the second charging/discharging connector connection check line and the eighth isolating element.

The foregoing and other objects, features, aspects and advantages of the present disclosure will become more apparent from the following detailed description of the present disclosure when taken in conjunction with the accompanying drawings.

DETAILED DESCRIPTION

Figure 1:
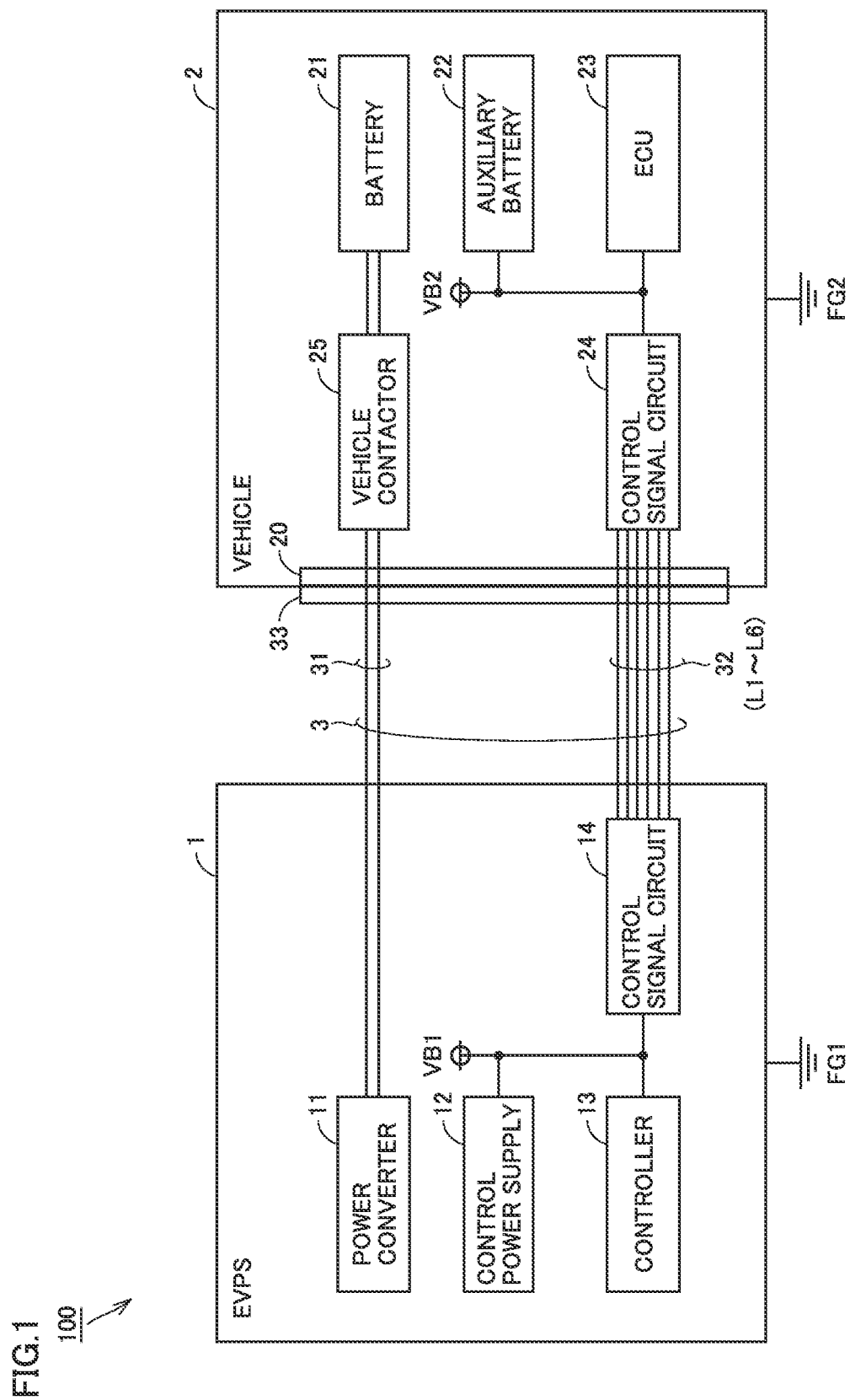
FIG. 1 schematically shows an overall configuration of a power management system according to Embodiment 1 of the present disclosure.

Embodiments of the present disclosure will now be described in detail with reference to the drawings. The same or corresponding elements in the drawings have the same reference characters allotted, and description thereof will not be repeated.

In the present disclosure and the embodiments of the present disclosure, the term "charging/discharging" means at least one of charging and discharging. In other words, a vehicle configured to perform charging/discharging between a power facility and the vehicle may be configured to perform only charging between the power facility and the vehicle, may be configured to perform only discharging between the power facility and the vehicle, or may be configured to perform both of charging and discharging between the power facility and the vehicle.

Embodiment 1

<System Configuration Diagram>

FIG. 1 schematically shows an overall configuration of a power management system according to Embodiment 1 of the present disclosure. A power management system 100 includes an EVPS (electric vehicle power system) 1, a vehicle 2, and a charging/discharging cable assembly 3.

EVPS 1 and vehicle 2 are connected to each other by charging/discharging cable assembly 3.

EVPS 1 is, for example, a power facility for a vehicle of public or home DC (direct current) type. In the present embodiment, EVPS 1 can perform both of charging and discharging of vehicle 2. More specifically, EVPS 1 is configured to receive AC (alternate current) power from a power system through a power transmission line, convert the AC power into DC power, and supply the DC power to vehicle 2 through charging/discharging cable assembly 3. EVPS 1 is also configured to receive DC power from vehicle 2 through charging/discharging cable assembly 3, convert the DC power into AC power, and supply the AC power to the power system through the power transmission line.

Vehicle 2, which is connectable to the outside, is specifically a BEV (Battery Electric Vehicle), a PHEV (Plug-in Hybrid Electric Vehicle), or a PFCEV (Plug-in Fuel Cell Electric Vehicle).

Charging/discharging cable assembly 3 electrically connect EVPS 1 to vehicle 2. Charging/discharging cable assembly 3 may be a cable assembly dedicated to charging of vehicle 2 or a cable assembly dedicated to discharging of vehicle 2.

Specifically, EVPS 1 includes a power converter 11, a control power supply 12, a controller 13, and a control signal circuit 14. Vehicle 2 includes a vehicle inlet 20, a main battery 21, an auxiliary battery 22, an ECU (Electronic Control Unit) 23, a control signal circuit 24, a vehicle contactor 25, and a relay 26 (see FIG. 2). Charging/discharging cable assembly 3 includes a power line 31, a signal line 32, and a charging/discharging connector 33.

Power converter 11 includes an AC/DC converter (not shown). Power converter 11 may further include a DC/DC converter (not shown). Power converter 11 converts the AC power supplied from the power system into DC power suitable for charging of vehicle 2, according to a command from controller 13. Power converter 11 also converts the DC power discharged from vehicle 2 into AC power suitable for supply to the power system, according to a command from controller 13.

Control power supply 12 supplies a prescribed operating voltage VB1 to controller 13 and control signal circuit 14. For example, operating voltage VB1=12 V. Controller 13 and control signal circuit 14 are electrically connected to a frame ground FG1.

Controller 13 includes a processor such as a CPU (Central Processing Unit), a memory such as a ROM (Read Only Memory) or a RAM (Random Access Memory), and an I/O port, which are not shown. Controller 13 performs various processes based on a program stored in a memory and a control signal transmitted from vehicle 2 (ECU 23) through charging/discharging cable assembly 3. More specifically, controller 13 controls a charging sequence and/or a discharging sequence of EVPS 1 through communications (input and output of various control signals) with ECU 23.

Control signal circuit 14 is connected to controller 13. Control signal circuit 14 is electrically connected to control signal circuit 24 of vehicle 2 via charging/discharging cable assembly 3. Control signal circuit 14 is configured to perform prescribed signal conversion of signals transmitted through signal line 32 of charging/discharging cable assembly 3. A detailed circuit configuration of control signal circuit 14 will be described with reference to FIG. 2.

Vehicle inlet 20 is configured to be mechanically coupled with charging/discharging connector 33 of charging/discharging cable assembly 3. As the user (such as the driver of vehicle 2 or the operator working in the facility provided with EVPS 2) couples charging/discharging connector 33 to vehicle inlet 20, between vehicle 2 and EVPS 1, an electrical connection for power transmission is ensured, and various control signals can be transmitted and received.

Main battery 21 is an assembled battery including a plurality of cells (not shown). Each cell is a secondary cell such as a lithium ion cell or a nickel metal-hydride cell. Main battery 21 supplies a motor generator (not shown) with electric power for generating a driving force of vehicle 2. Main battery 21 also stores electric power generated by the motor generator upon regenerative braking of vehicle 2. Main battery 21 may be a capacitor such as an electric double layer capacitor.

Auxiliary battery 22 is a secondary battery such as a lead acid battery or a lithium ion battery. Auxiliary battery 22 supplies a prescribed operating voltage VB2 to ECU 23, control signal circuit 24, and auxiliary machines (not shown). For example, operating voltage VB2=12 V. Auxiliary battery 22 may be replaced with a circuit that down-converts electric power of main battery 21 and outputs the down-converted electric power. ECU 23 and control signal circuit 24 are electrically connected to a frame ground FG2.

ECU 23 includes a processor such as a CPU, a memory such as a ROM and a RAM, and an I/O port, which are not shown. ECU 23 performs various processes based on a program stored in a memory and a control signal transmitted from EVPS 1 (controller 13) through charging/discharging cable assembly 3. More specifically, ECU 23 detects connection between EVPS 1 and vehicle 2. ECU 23 also controls a charging sequence and/or a discharging sequence of vehicle 2 through communications with controller 13. The charging sequence will be described with reference to FIG. 6.

Control signal circuit 24 is connected to ECU 23. Control signal circuit 24 is also electrically connected to control signal circuit 14 of EVPS 1 via charging/discharging cable assembly 3. Control signal circuit 24 is configured to perform prescribed signal conversion of a signal transmitted through signal line 32 of charging/discharging cable assembly 3. A detailed circuit configuration of control signal circuit 24 will also be described with reference to FIG. 2.

Power line 31 includes a pair of power lines and is used in power transmission between EVPS 1 and vehicle 2. In vehicle 2, power line 31 is electrically connected with vehicle contactor 25.

Signal line 32 is used in signal transmission between EVPS 1 and vehicle 2. As will be described in detail with reference to FIG. 2, signal line 32 includes six signal lines L1 to L6 in this example.

Charging/discharging connector 33 is provided at one end of charging/discharging cable assembly 3 and is coupled to vehicle inlet 20. The other end of charging/discharging cable assembly 3 is electrically connected to EVPS 1.

Though not shown, controller 13 and ECU 23 are connected by a communication line conforming to a predetermined communication standard.

Specifically, controller 13 and ECU 23 are connected through a CAN (Controller Area Network) communication line and are configured to communicate with each other according to the CAN communication standard.

<Detailed Circuit Configuration>

Figure 2:
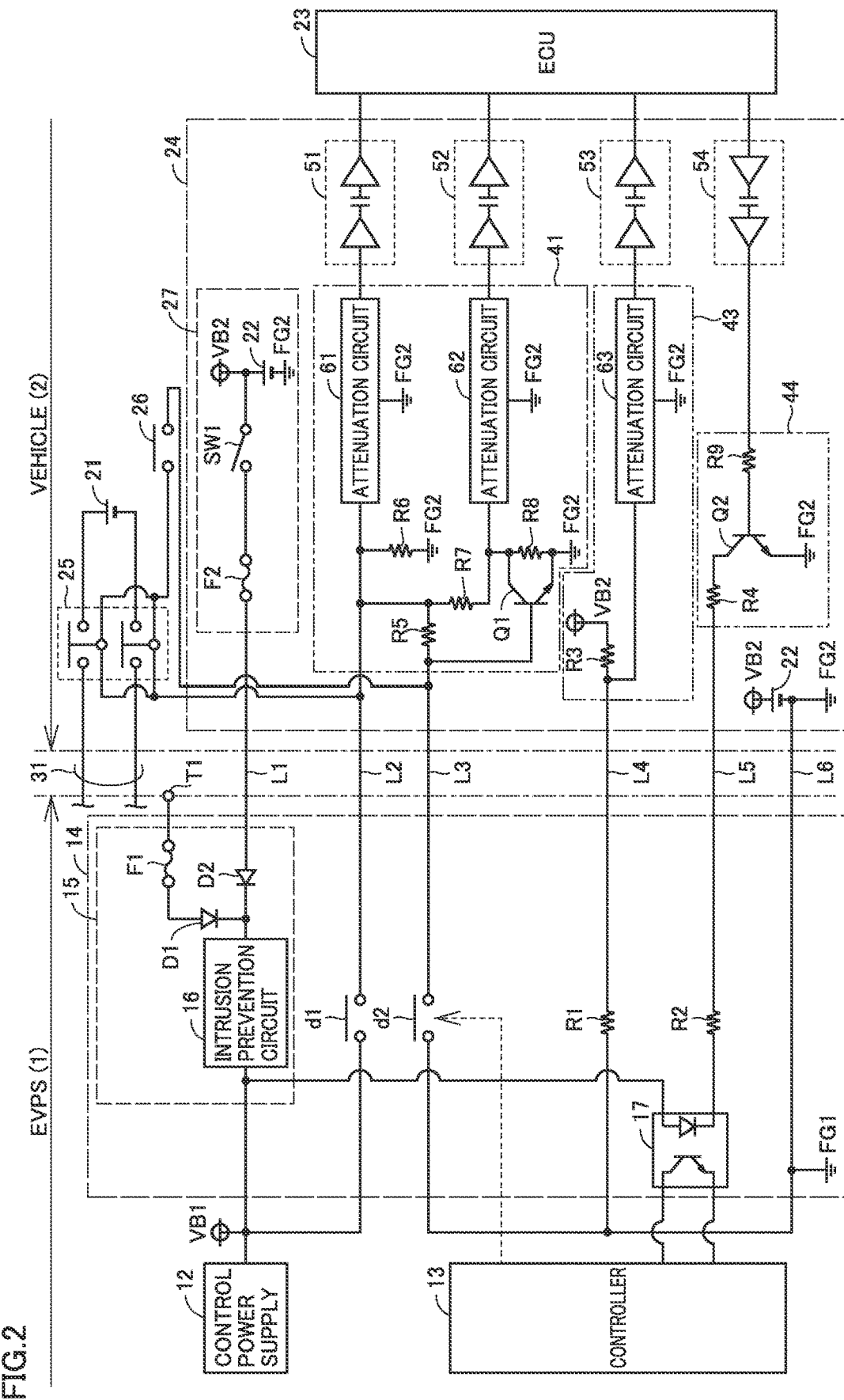
FIG. 2 is a circuit block diagram showing detailed configuration examples of a control signal circuit of an EVPS and a control signal circuit of a vehicle in Embodiment 1.

FIG. 2 is a circuit block diagram showing detailed configuration examples of control signal circuit 14 of EVPS 1 and control signal circuit 24 of vehicle 2 in Embodiment 1. Embodiment 1 will describe a configuration example in which various signal lines and control signal circuits 14, 24 conform to the CHAdeMO-related standard. In FIG. 2, charging/discharging connector 33 and vehicle inlet 20 are not shown due to space limitation.

Signal line 32 includes a charging/discharging connector 12V line L1, an actuation start/stop line L2, an actuation start/stop line L3, a charging/discharging connector connection check line L4, an actuation permission/prohibition line L5, and a ground line L6.

Charging/discharging connector 12V line L1 connects control power supply 12 of EVPS 1 to auxiliary battery 22 of vehicle 2. Accordingly, if control power supply 12 is not provided in EVPS 1, an operating voltage of 12 V can be supplied from vehicle 2 to EVPS 1.

Actuation start/stop lines L2, L3 are used for transmission of an actuation start/stop 1 signal and an actuation start/stop 2 signal. More specifically, controller 13 outputs the actuation start/stop 1 signal to ECU 23 to notify the start of charging/discharging control. Upon receipt of the actuation start/stop 1 signal, ECU 23 detects the start of charging/discharging control. Controller 13 also outputs the actuation start/stop 2 signal to ECU 23 to notify the completion of isolation diagnosis in EVPS 1. Upon receipt of the actuation start/stop 2 signal, ECU 23 determines that no unusual short-circuit has occurred, and then turns on vehicle contactor 25.

Charging/discharging connector connection check line L4 is used for ECU 23 to detect that charging/discharging connector 33 is connected to vehicle inlet 20. When the voltage input from charging/discharging connector connection check line L4 is within a prescribed voltage range, ECU 23 can detect the connection of charging/discharging connector 33 to vehicle inlet 20.

Actuation permission/prohibition line L5 is used for transmission of actuation permission/prohibition signals. ECU 23 outputs an actuation permission/prohibition signal to controller 13 to notify that the preparation for charging/discharging in vehicle 2 is complete. Upon receipt of the actuation permission/prohibition signal, controller 13 controls a latch mechanism (not shown) provided in charging/discharging connector 33 to perform a latch-and-hold operation, thereby mechanically fixing charging/discharging connector 33 to vehicle inlet 20. When ending an instruction of charging/discharging from vehicle 2, ECU 23 stops output of the actuation permission/prohibition signal. Controller 13 stops input and out of a current to and from controller 13, as output of the actuation permission/prohibition signal is stopped.

When EVPS 1 and vehicle 2 are electrically connected by charging/discharging cable assembly 3, ground line L6 is connected to frame ground FG1 of EVPS 1 and frame ground FG2 of vehicle 2.

Relay 26 is connected to a control terminal of vehicle contactor 25. When relay 26 is closed according to a command from ECU 23, vehicle contactor 25 is closed. Accordingly, main battery 21 and power line 31 are electrically connected, allowing main battery 21 to perform charging/discharging.

Control signal circuit 14 of EVPS 1 includes an optional circuit 15. Optional circuit 15 includes an intrusion prevention circuit 16, diodes D1, D2, and a fuse F1. Control signal circuit 14 further includes switches d1, d2, a photocoupler 17, and resistors R1, R2. The installation of optional circuit 27 is optional, and accordingly, control signal circuit 24 may include no optional circuit 27.

Control signal circuit 24 of vehicle 2 includes an optional circuit 27, compatible circuits 41, 43, 44, and isolating elements 51 to 54. Compatible circuit 41 includes resistors R5 to R8, a switch Q1, and attenuation circuits 61, 62. Compatible circuit 43 includes a resistor R3 and an attenuation circuit 63. Compatible circuit 44 includes a resistor R4, a switch Q2, and a resistor R9. The installation of optional circuit 27 is also optional, and accordingly, control signal circuit 24 may include no optional circuit 27.

Diode D1 and fuse F1 are electrically connected between a power supply terminal for EVPS T1 and charging/discharging connector 12V line L1. Power supply terminal for EVPS T1 is, for example, a terminal in a cigarette lighter plug. Power supply terminal for EVPS T1 is connected with an external power supply (not shown). Diode D1 regulates the direction of a current flowing through charging/discharging connector 12V line L1 to the direction from power supply terminal for EVPS T1 toward intrusion prevention circuit 16. Fuse F1 interrupts any overcurrent that may flow through intrusion prevention circuit 16 from the external power supply.

Diode D2, fuse F2, and a switch SW1 are electrically connected to charging/discharging connector 12V line L1. Diode D2 regulates the direction of a current flowing through charging/discharging connector 12V line L1 to the direction from vehicle 2 toward intrusion prevention circuit 16. Fuse F2 interrupts any overcurrent that may flow through intrusion prevention circuit 16 from auxiliary battery 22. Switch SW1 switches charging/discharging connector 12V line L1 between conduction and non-conduction according to a command from ECU 23.

Intrusion prevention circuit 16 prevents inflow of noise or current from power supply terminal for EVPS T1 or auxiliary battery 22 (in particular, a signal line other than charging/discharging connector 12V line L1) into control signal circuit 14.

Switch d1 is electrically connected to actuation start/stop line L2. Switch d1 switches actuation start/stop line L2 between conduction and non-conduction according to a command from controller 13. Switch d2 is electrically connected to actuation start/stop line L3. Switch d2 switches actuation start/stop line L3 between conduction and non-conduction according to a command from controller 13.

Resistor R1 is electrically connected to charging/discharging connector connection check line L4. Resistor R2 is electrically connected to actuation permission/prohibition line L5.

Photocoupler 17 is electrically connected to actuation permission/prohibition line L5. Photocoupler 17 is provided to ensure isolation between controller 13 and ECU 23 in actuation permission/prohibition line L5. Photocoupler 17 transmits, to controller 13, the actuation permission/prohibition signal sent from ECU 23.

Compatible circuits 41, 43, 44 are circuits for ensuring compatibility between controller 13 and the ECU of the vehicle. As disclosed in WO 2020/115821, a conventional control signal circuit of a vehicle includes a photocoupler according to the existing charging/discharging standard. Control signal circuit 14 on the EVPS side is configured to exchange control signals with the control signal circuit including such a photocoupler. In contrast, control signal circuit 14 included in vehicle 2 according to the present embodiment includes isolating elements 51 to 54 in place of the photocoupler. As compatible circuits 41, 43, 44 are provided, controller 13 can exchange control signals irrespective of whether a destination to which controller 13 is connected is a conventional control signal circuit or control signal circuit 14 in the present embodiment.

In compatible circuit 41, resistor R5 has a first end electrically connected to actuation start/stop line L3. Resistor R5 has a second end electrically connected to actuation start/stop line L2. Resistor R6 is electrically connected between actuation start/stop line L2 and frame ground FG2. Resistor R7 has a first end electrically connected to the second end of resistor R5 and actuation start/stop line L2. Resistor R7 has a second end electrically connected to attenuation circuit 62.

Switch Q1 is a normally-off switch, and is a bipolar switch in this example. Switch Q1 has a base electrically connected to actuation start/stop line L3 between switch d2 and resistor R5. Switch Q1 has a collector electrically connected to actuation start/stop line L3 between the second end of resistor R7 and attenuation circuit 62. Switch Q1 has an emitter electrically connected to frame ground FG2. Resistor R8 is electrically connected between the collector and the emitter of switch Q1. Switch Q1 may be another transistor such as an FET (Field Effect Transistor), or a relay.

Attenuation circuit 61 is electrically connected between actuation start/stop line L2 and isolating element 51.

Figure 3:
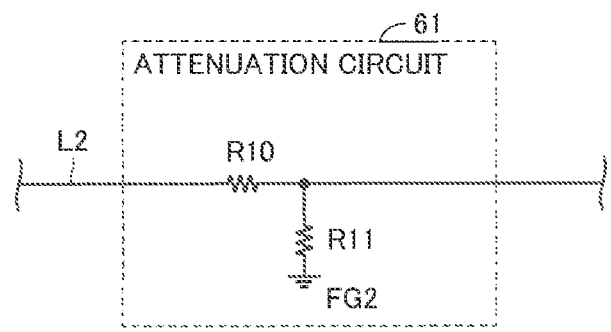
FIG. 3 shows a configuration example of an attenuation circuit.

FIG. 3 shows a configuration example of attenuation circuit 61. The attenuation circuit 61 is, for example, a resistive attenuator and includes resistors R10, R11. Resistor R10 is connected in series with actuation start/stop line L2. Resistor R11 is electrically connected between actuation start/stop line L2 and frame ground FG2. Though detailed description will not be repeated, attenuation circuits 62, 63 also have a similar configuration.

Returning back to FIG. 2, isolating element 51 is electrically connected between attenuation circuit 61 and ECU 23. Isolating element 51 transmits, from attenuation circuit 61 to ECU 23, an actuation start/stop 1 signal and an actuation start/stop 2 signal from controller 13 while isolating attenuation circuit 61 on the primary side from ECU 23 on the secondary side. More specifically, isolating element 51 is a digital isolator configured to transmit an AC signal from a primary side to a secondary side of this element while galvanically isolating the primary side from the secondary side.

Figure 4:
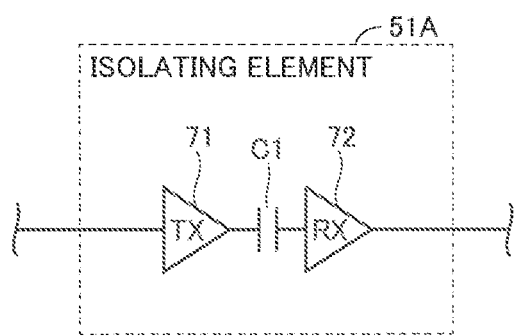
FIG. 4 shows a configuration example of an isolating element.

FIG. 4 shows a configuration example of isolating element 51. An isolating element 51A is, for example, a digital isolator of capacitive coupling type (capacitive isolation type). Isolating element 51A includes, for example, a differential driver 71 for CMOS (Complementary Metal-Oxide Semiconductor) input, a capacitor C1, and a differential receiver 72 for CMOS input. In isolating element 51A, charging/discharging of capacitor C1 is involved between differential driver 71 on the primary side and differential receiver 72 on the secondary side. Accordingly, differential driver 71 and differential receiver 72 are electrically separated without directly exchanging electric signals.

Figure 5:
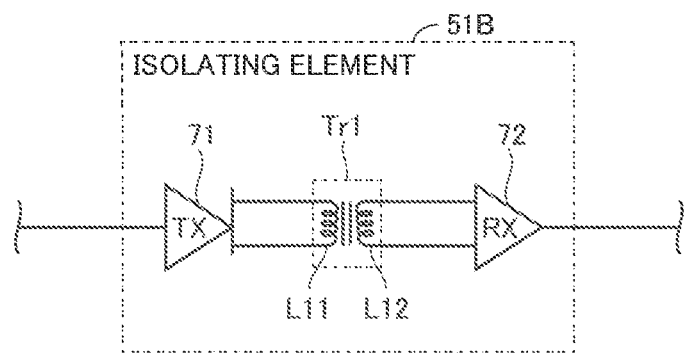
FIG. 5 shows another configuration example of the isolating element.

FIG. 5 shows another configuration example of isolating element 51. Isolating element 51B may be, for example, a digital isolator of magnetic coupling type (magnetic isolation type). Isolating element 51B includes differential driver 71 for CMOS input, an isolation transformer Tr1, and differential receiver 72 for CMOS input. In isolating element 51B, an electric signal sent from differential driver 71 on the primary side is converted into magnetic energy at coils L11, L12 of isolation transformer Tr1. This magnetic energy is again converted into an electric signal and is transferred to differential receiver 72 on the secondary side. Differential driver 71 and differential receiver 72 are electrically separated through such electricity-magnetism conversion at coils L11, L12.

Both of the digital isolator of capacitive coupling type and the digital isolator of magnetic coupling type have advantages of lower consumption current, a longer life, a higher speed, and lower noise over the photocoupler. Note that the digital isolator of capacitive coupling type and the digital isolator of magnetic coupling type do not support transmission of analog signals, as opposed to the photocoupler.

Referring again to FIG. 2, attenuation circuit 62 is electrically connected between actuation start/stop line L3 and isolating element 52. The configuration of attenuation circuit 62 is equivalent to the configuration of attenuation circuit 61 (see FIG. 3).

Isolating element 52 is electrically connected between attenuation circuit 62 and ECU 23. Isolating element 52 transmits, from attenuation circuit 62 to ECU 23, an actuation start/stop 1 signal and an actuation start/stop 2 signal from controller 13 while isolating attenuation circuit 62 on the primary side from ECU 23 on the secondary side. Isolating element 52 is a digital isolator of capacitive coupling type or magnetic coupling type (see FIG. 4 or 5) equivalent to isolating element 51.

In compatible circuit 43, resistor R3 is a pull-up resistor that pulls up an electric potential of charging/discharging connector connection check line L4 to operating voltage VB2 of auxiliary battery 22.

Attenuation circuit 63 is electrically connected between charging/discharging connector connection check line L4 and isolating element 53. The configuration of attenuation circuit 63 is also equivalent to the configuration of attenuation circuit 61 (see FIG. 3).

Isolating element 53 is electrically connected between attenuation circuit 63 and ECU 23. Isolating element 53 transmits, from attenuation circuit 63 to ECU 23, a signal for vehicle 2 to detect that charging/discharging connector 33 is connected to vehicle inlet 20, while isolating attenuation circuit 63 on the primary side from ECU 23 on the secondary side. Isolating element 53 is a digital isolator of capacitive coupling type or magnetic coupling type (see FIG. 4 or 5) equivalent to isolating elements 51, 52.

In compatible circuit 44, resistor R4 is electrically connected to actuation permission/prohibition line L5.

Switch Q2 is a normally-off switch and is a bipolar transistor in this example. Switch Q2 has a collector electrically connected to actuation permission/prohibition line L5. Switch Q2 has an emitter electrically connected to frame ground FG2. Switch Q2 has a base electrically connected to isolating element 54 via resistor R9. Switch Q2 may be another transistor such as an FET, or a relay, similarly to switch Q1.

Isolating element 54 is electrically connected between ECU 23 and the base of switch Q2. Isolating element 54 transmits an actuation permission/prohibition signal from ECU 23 to resistor R9 while isolating ECU 23 on the primary side from resistor R9 on the secondary side. Isolating element 54 is a digital isolator of capacitive coupling type or magnetic coupling type (see FIG. 4 or 5) equivalent to isolating elements 51 to 53.

Isolating elements 51 to 54 may be implemented as discrete parts, or may be implemented as an IC (Integrated Circuit) in one package. Implementing such isolating elements in one package leads to miniaturized control signal circuit 24. When control signal circuit 24 is disposed within ECU 23, ECU 23 can be miniaturized.

Attenuation circuits 61 to 63 are provided to protect ECU 23 by lowering a voltage level of a control signal transmitted on a corresponding signal line. As long as ECU 23 can operate normally even when a control signal is directly input to ECU 23 without attenuation, attenuation circuits 61 to 63 may not be provided. This leads to further miniaturized control signal circuit 24.

<Comparison with Conventional Art>

The control signal circuit for a vehicle disclosed in WO 2020/115821 includes a photocoupler of optical coupling type as an isolating element. In the photocoupler, a light emitting element such as an LED (Light Emitting Diode) is always caused to emit light during a period in which an input signal is H (logic high). As the light emitting element reaches the end of life due to increased degradation of the light emitting element, signal transmission between the EVPS and the vehicle may no longer be possible. Also, electric power is continuously consumed while the light emitting element is emitting light.

It is assumed that particularly when a vehicle is used in V2H, V2G, or the like, the EVPS and the vehicle may remain connected for a long period of time. The photocoupler may not be able to withstand long-term use in V2H or V2G due to the end of life of the light emitting element.

In addition, as the luminous efficiency of the light emitting element decreases due to the degradation of the photocoupler, the CTR (Current Transfer Ratio) of the photocoupler decreases. The CTR is a ratio of a current output from a light receiving element (such as a phototransistor) to a current (typically, a forward current of an LED) input to a light emitting element. In order to maintain an output current of the light emitting element at a required value even when the luminous efficiency of the light receiving element decreases, the input current to the light emitting element has to be set to a somewhat great value from the beginning. Consequently, the power consumption of the photocoupler may increase. An amount of power consumption obtained by adding up power consumption of the photocoupler for a long period of time may become too large to ignore.

In contrast, control signal circuit 24 of vehicle 2 according to Embodiment 1 includes digital isolators of capacitive coupling type or magnetic coupling type as isolating elements 51 to 54. In the case of the digital isolator of capacitive coupling type or magnetic coupling type, differently from the photocoupler, the light emitting element does not reach the end of life, and the light emitting element does not continuously consume electric power. Also, a decrease in the CTR associated with the degradation of the digital isolator needs not to be taken into consideration. Compared with the vehicle disclosed in WO 2020/115821, thus, vehicle 2 according to Embodiment 1 can reduce power consumption associated with the transmission of a control signal between EVPS 1 and vehicle 2 and is suitable for long-term use in V2H or V2G.

<Operation of Control Signal Circuit>

Figure 6:
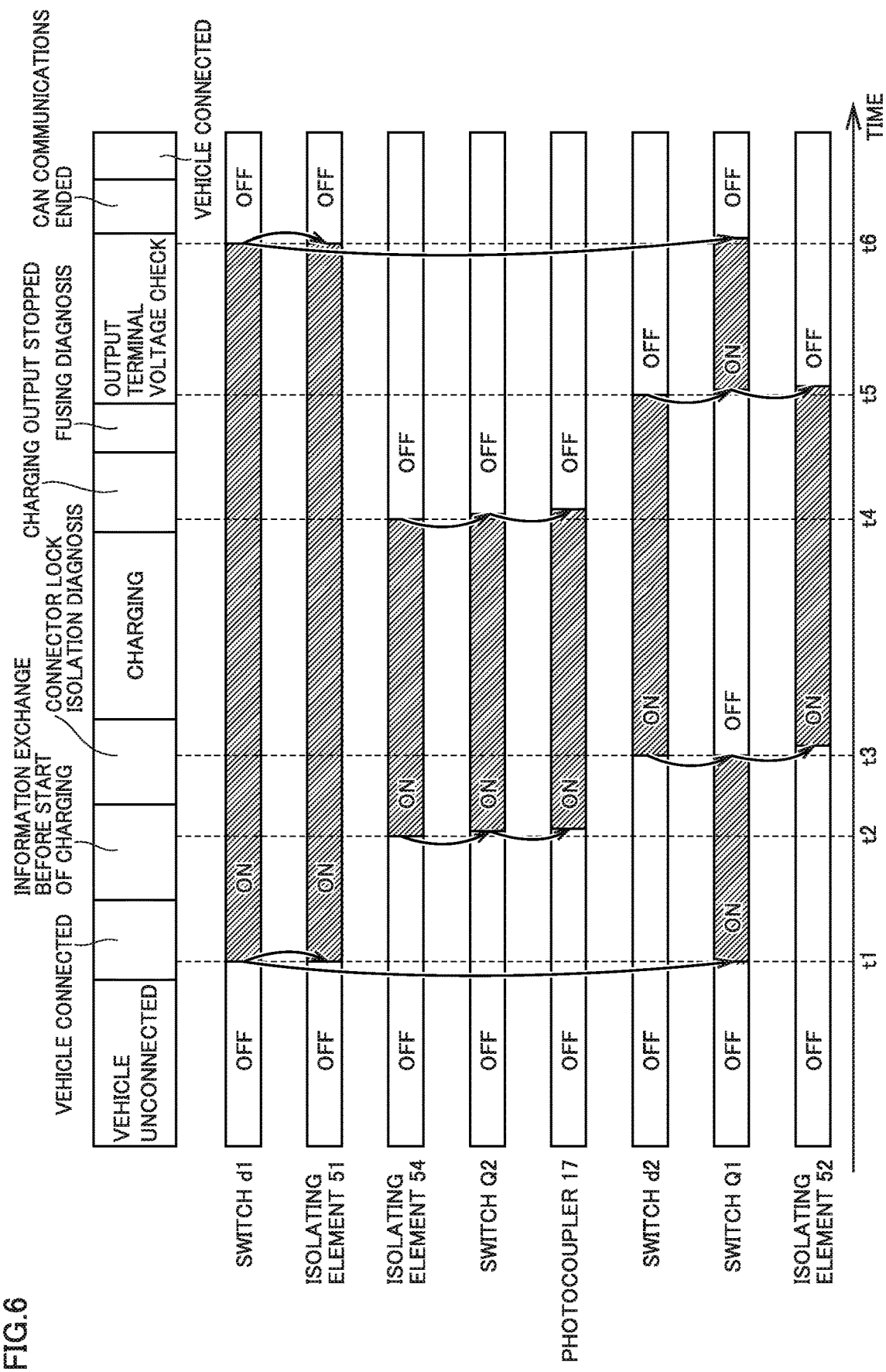
FIG. 6 is a time chart for illustrating an operation of the control signal circuit in Embodiment 1.

FIG. 6 is a time chart for illustrating operations of control signal circuits 14, 24 in Embodiment 1. In this example, a series of operations for charging vehicle 2 from EVPS 1 will be described. The horizontal axis represents a time elapsed. The vertical axis represents, from top to bottom, ON (closed)/OFF (open) of switch d1, a signal level of isolating element 51, a signal level of isolating element 54, ON (conduction)/OFF (non-conduction) of switch Q2, a signal level of a photocoupler, ON/OFF of switch d2, ON/OFF of switch Q1, and a signal level of isolating element 52. At an initial time t0, EVPS 1 and vehicle 2 are not connected by charging/discharging cable assembly 3, and each component is OFF.

At a time t1, when connection between EVPS 1 and vehicle 2 is detected with charging/discharging connector connection check line L4, controller 13 outputs an actuation start/stop 1 signal to ECU 23 through actuation start/stop lines L2, L3. More specifically, controller 13 switches switch d1 from OFF to ON. This turns on isolating element 51. ECU 23 detects the actuation start/stop 1 signal from controller 13. At the same time, a current (base current) is supplied to the base of switch Q1 through switch d1 and resistor R5 to turn on switch Q1, thus turning off isolating element 52.

At a time t2, ECU 23 outputs an actuation permission/prohibition signal (actuation permission signal) to controller 13 through actuation permission/prohibition line L5 to notify that vehicle 2 is capable of charging/discharging. More specifically, ECU 23 turns on isolating element 54. Then, a base current is supplied to switch Q2 through resistor R9, thus turning on switch Q2. Consequently, photocoupler 17 is turned on. Controller 13 thus detects the actuation permission/prohibition signal from ECU 23. Upon detection of the actuation permission/prohibition signal, controller 13 controls a latch mechanism (not shown) to perform a latch-and-hold operation for mechanically fixing charging/discharging connector 33 to vehicle inlet 20. In some embodiments, ECU 23 notifies through CAN communications that vehicle 2 is capable of charging/discharging in addition to outputting the actuation permission/prohibition signal to actuation permission/prohibition line L5.

At a time t3, controller 13 outputs the actuation start/stop 2 signal to ECU 23 through actuation start/stop lines L2, L3. More specifically, controller 13 switches switch d2 from OFF to ON. Thus, supply of the base current to switch Q1 is stopped, thus turning off switch Q1. Along with this, a collector voltage of switch Q1 (a voltage of a node between resistor R7 and resistor R8) rises, thus turning on isolating element 52. Thus, ECU 23 detects the actuation start/stop 2 signal from controller 13. Upon detection of the actuation start/stop 2 signal, ECU 23 controls relay 26 to turn on vehicle contactor 25. Then, charging from EVPS 1 to vehicle 2 starts.

At a time t4 after the end of charging, ECU 23 outputs an actuation permission/prohibition signal (actuation prohibition signal) to controller 13 through actuation permission/prohibition line L5 to notify that the instruction for charging/discharging of vehicle 2 is to end. More specifically, ECU 23 turns off isolating element 54. Thus, supply of the base current to switch Q2 is stopped, thus turning off switch Q2. Consequently, photocoupler 17 is turned off. Thus, controller 13 detects the actuation permission/prohibition signal from ECU 23. Upon detection of the actuation permission/prohibition signal, controller 13 stops input and output of a current to and from EVPS 1. In some embodiments, ECU 23 notifies through CAN communications that the instruction for charging/discharging of vehicle 2 is to end, in addition to outputting the actuation permission/prohibition signal to actuation permission/prohibition line L5.

At a time t5, controller 13 switches switch d2 from ON to OFF. Thus, a base current is supplied to switch Q1, thus turning on switch Q1. Thus, a collector voltage of switch Q1 drops, thus turning off isolating element 52.

At a time t6, controller 13 switches switch d1 from ON to OFF. Thus, isolating element 51 is turned off. At the same time, supply of the base current to switch Q1 is stopped, thus turning off switch Q1.

As described above, in Embodiment 1, control signal circuit 24 of vehicle 2 includes isolating elements 51 to 54 in place of the photocoupler and also includes compatible circuits 41, 43, 44. Isolating elements 51 to 54, which are digital isolators of capacitive coupling type or magnetic coupling type, consume electric power only in transmission of a control signal. Also, a decrease in the CTR due to the degradation of the digital isolator needs not to be taken into consideration. Contrastingly, even when controller 13 of EVPS 1 is connected to a conventional control signal circuit as disclosed in WO 2020/115821 or when controller 13 of EVPS 1 is connected to control signal circuit 24 in the present embodiment, compatible circuits 41, 43, 44 allow controller 13 to exchange various control signals with the ECU of vehicle. Thus, Embodiment 1 can reduce power consumption associated with the transmission of a control signal between EVPS 1 and vehicle 2 while ensuring compatibility. Also, the end of life of the light emitting element of the photocoupler is not an issue.

Variation of Embodiment 1

Figure 7:
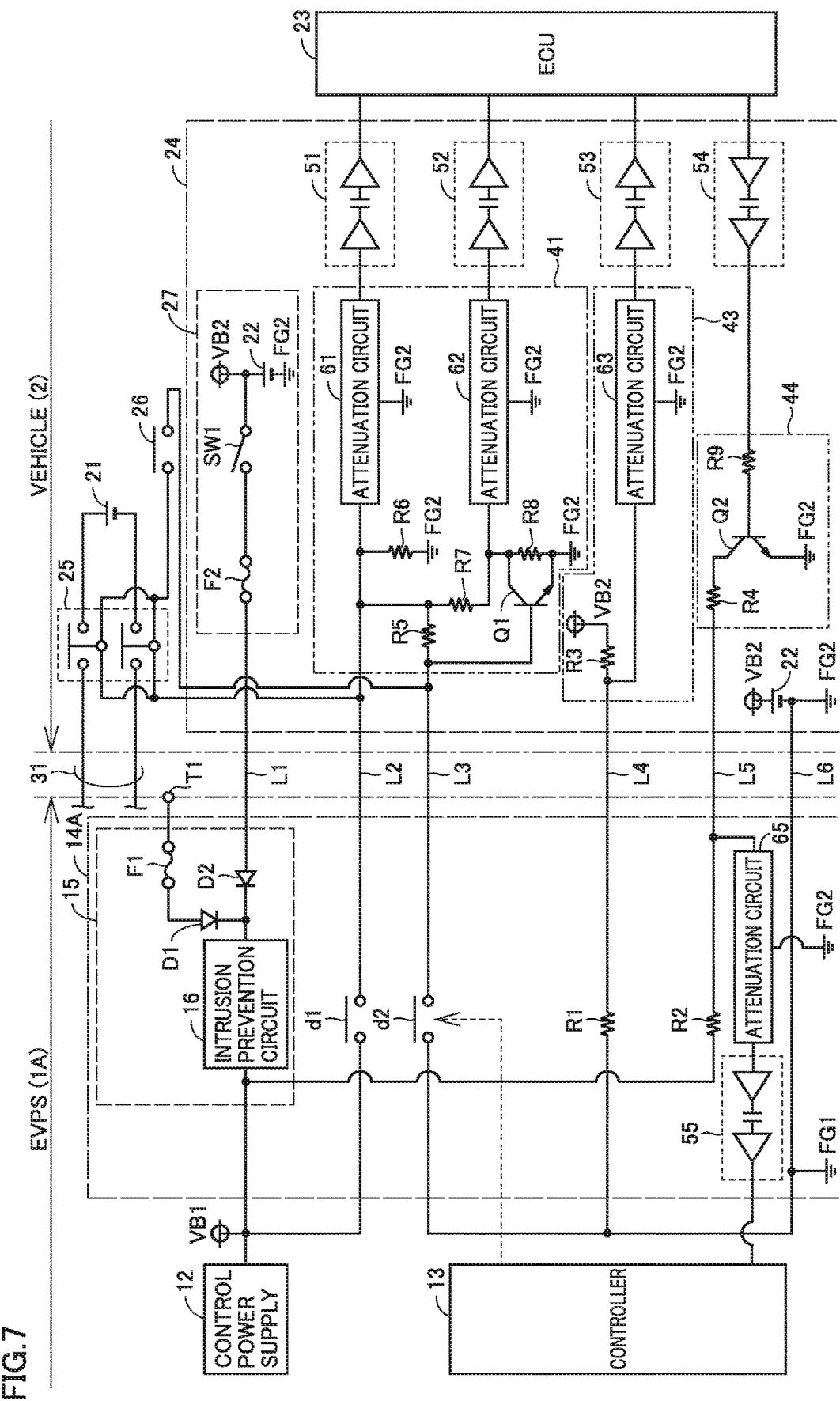
FIG. 7 is a circuit block diagram showing detailed configuration examples of a control signal circuit of an EVPS and a control signal circuit of a vehicle in a variation of Embodiment 1.

FIG. 7 is a circuit block diagram showing detailed configuration examples of the control signal circuit of the EVPS and control signal circuit 24 of vehicle 2 in a variation of Embodiment 1. In Embodiment 2, an EVPS 1A includes a control signal circuit 14A. Control signal circuit 14A differs from control signal circuit 14 in Embodiment 1 in that it includes an attenuation circuit 65 and an isolating element 55 in place of photocoupler 17.

Attenuation circuit 65 is electrically connected between actuation permission/prohibition line L5 and isolating element 55. The configuration of attenuation circuit 65 is equivalent to the configuration of attenuation circuit 61 (see FIG. 3).

Isolating element 55 is electrically connected between attenuation circuit 65 and controller 13. Isolating element 55 transmits, from attenuation circuit 65 to controller 13, an actuation permission/prohibition signal from ECU 23 while isolating attenuation circuit 65 on the primary side from controller 13 on the secondary side. Isolating element 55 is a digital isolator of capacitive coupling type or magnetic coupling type (see FIG. 4 or 5) equivalent to isolating elements 51 to 55.

As described above, in the variation of Embodiment 1, control signal circuit 14A of EVPS 1A includes isolating element 55 in place of photocoupler 17. Isolating element 55, which is a digital isolator of capacitive coupling type or magnetic coupling type, consumes electric power only in transmission of a control signal. Also, a decrease in the CTR due to the degradation of the digital isolator needs not to be taken into consideration. Thus, the variation of Embodiment 1 can reduce power consumption of EVPS 1A in addition to reducing power consumption of vehicle 2 while ensuring compatibility.

Switches d1, d2 correspond to the "first switch" and "second switch" according to the present disclosure, respectively. Actuation start/stop lines L2, L3 correspond to the "first actuation start/stop line" and "second actuation start/stop line" according to the present disclosure, respectively. Isolating elements 51 to 54 correspond to the "first isolating element" to "fourth isolating element" according to the present disclosure, respectively. Attenuation circuits 61 to 63 correspond to the "first attenuation circuit" to "third attenuation circuit" according to the present disclosure, respectively. Resistors R5, R6, R7, R8, R3, R4, R9 correspond to the "first resistor" to "seventh resistor" according to the present disclosure, respectively. Switches Q1, Q2 correspond to the "first transistor" and "second transistor" according to the present disclosure, respectively.

Embodiment 2

Embodiment 2 will describe an example conforming to the GB/T-related standard.

Figure 8:
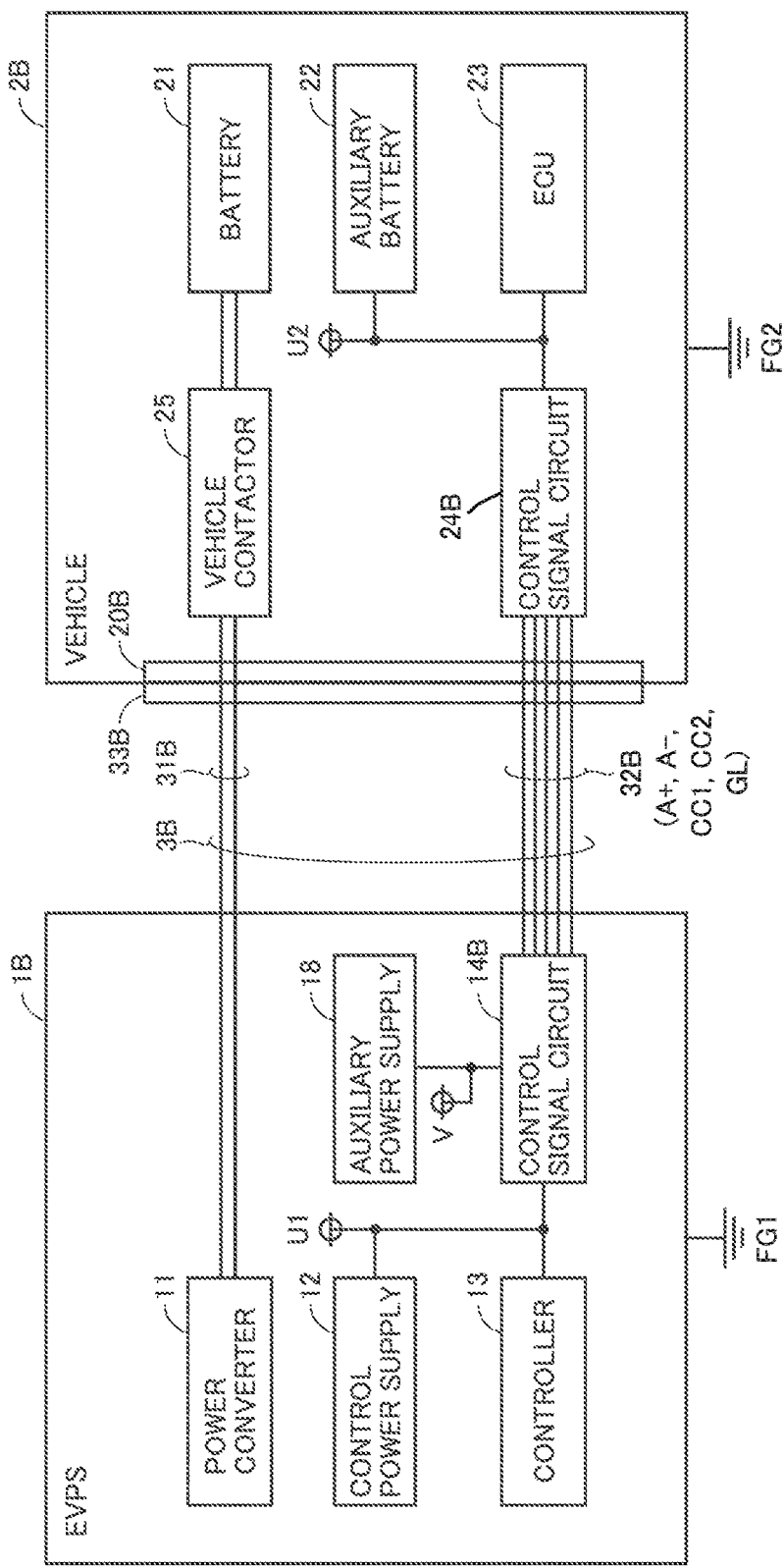
FIG. 8 schematically shows an overall configuration of a power management system according to Embodiment 2.

FIG. 8 schematically shows an overall configuration of a power management system according to Embodiment 2. A power management system 200 includes an EVPS 1B, a vehicle 2B, and a charging/discharging cable assembly 3B. EVPS 1B differs from EVPS 1 according to Embodiment 1 (see FIG. 2) in that it includes a control signal circuit 14B in place of control signal circuit 14 and further includes an auxiliary power supply 18. Vehicle 2B differs from vehicle 2 according to Embodiment 1 in that it includes a control signal circuit 24B in place of control signal circuit 24.

Figure 9:
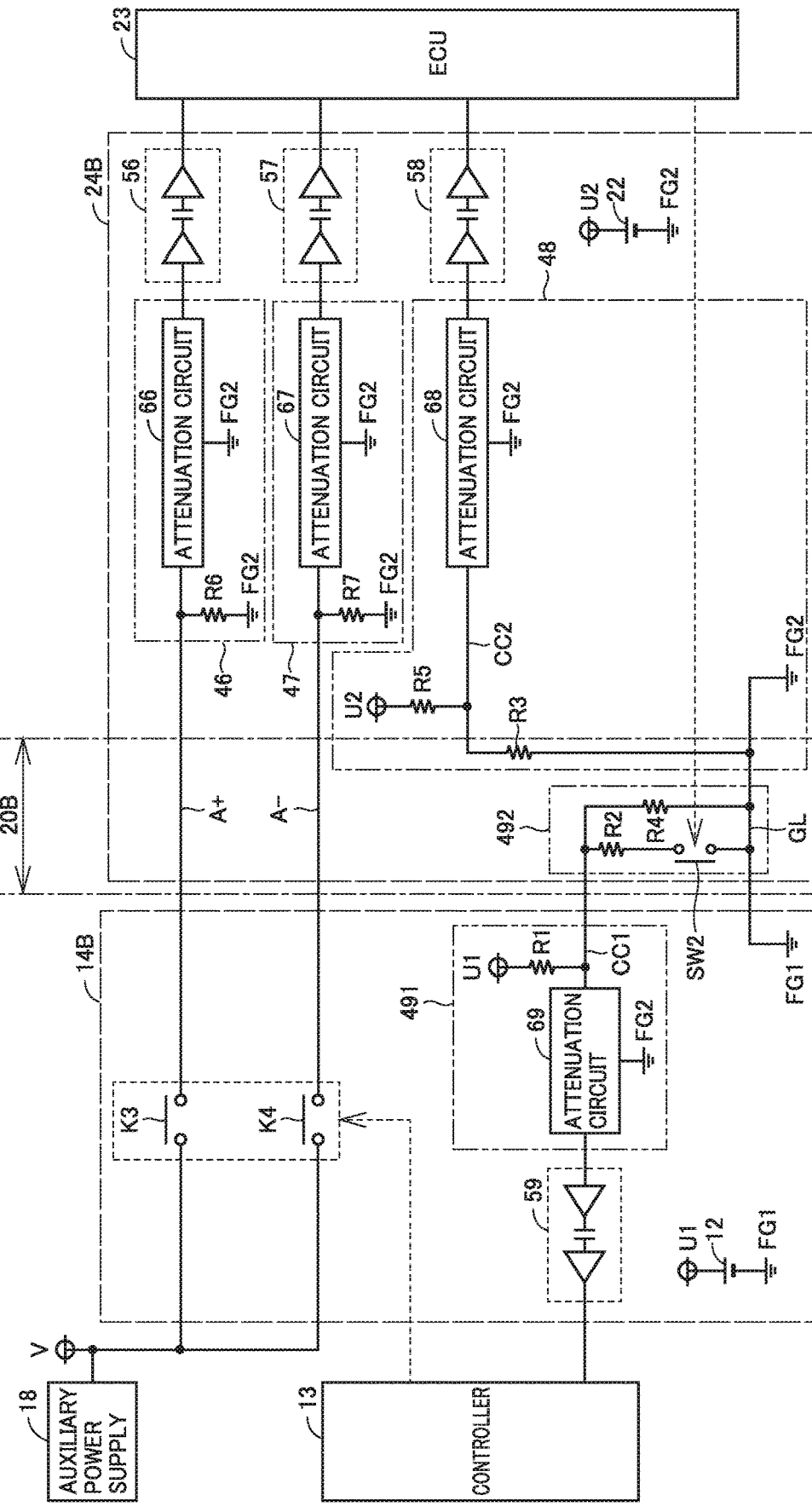
FIG. 9 is a circuit block diagram showing detailed configuration examples of a control signal circuit of an EVPS and a control signal circuit of a vehicle in Embodiment 2.

FIG. 9 is a circuit block diagram showing detailed configuration examples of control signal circuit 14B of EVPS 1B and control signal circuit 24B of vehicle 2B in Embodiment 2.

A signal line 32B of charging/discharging cable assembly 3B includes five signal lines in this example. More specifically, signal line 32B includes low-voltage auxiliary feeding circuit lines A+, A−, charging/discharging connector connection check lines CC1, CC2, and a ground line GL.

Low-voltage auxiliary feeding circuit lines A+, A− are connected to auxiliary power supply 18 that supplies a prescribed voltage. Low-voltage auxiliary feeding circuit lines A+, A− are used to transmit a signal instructing to start actuation and stop actuation from controller 13 to ECU 23.

Charging/discharging connector connection check line CC1 is used for ECU 23 to detect that charging/discharging connector 33B is connected to vehicle inlet 20B. Charging/discharging connector connection check line CC2 is used for ECU 23 to detect that charging/discharging connector 33B is connected to vehicle inlet 20B.

Ground line GL is connected to frame ground FG1 of EVPS 1B and frame ground FG2 of vehicle 2B when EVPS 1B and vehicle 2B are electrically connected by charging/discharging cable assembly 3B.

Control signal circuit 14B of EVPS 1B includes switches K3, K4, a compatible circuit 491, and an isolating element 59. Compatible circuit 491 includes resistor R1 and an attenuation circuit 69.

Control signal circuit 24B of vehicle 2B includes compatible circuits 46 to 48 and isolating elements 56 to 58. Compatible circuit 46 includes resistor R6 and an attenuation circuit 66. Compatible circuit 47 includes resistor R7 and an attenuation circuit 67. Compatible circuit 48 includes resistors R3, R5 and an attenuation circuit 68. A compatible circuit 492 includes resistor R2, a switch SW2, and resistor R4.

Switch K3 is electrically connected to low-voltage auxiliary feeding circuit line A+. Switch K3 switches low-voltage auxiliary feeding circuit line A+ between conduction and non-conduction according to a command from controller 13. Resistor R6 is electrically connected between low-voltage auxiliary feeding circuit line A+ and frame ground FG2. Attenuation circuit 66 is electrically connected between low-voltage auxiliary feeding circuit line A+ and isolating element 56. The configuration of attenuation circuit 66 is equivalent to the configuration of attenuation circuit 61 (see FIG. 3).

Isolating element 56 is electrically connected between attenuation circuit 66 and ECU 23. Isolating element 56 transmits, from attenuation circuit 66 to ECU 23, a signal from controller 13 while isolating attenuation circuit 66 on the primary side from ECU 23 on the secondary side. Isolating element 56 is a digital isolator of capacitive coupling type or magnetic coupling type (see FIG. 4 or 5) equivalent to isolating element 51.

Switch K4 is electrically connected to low-voltage auxiliary feeding circuit line A−. Switch K4 switches low-voltage auxiliary feeding circuit line A− between conduction and non-conduction according to a command from controller 13. Resistor R7 is electrically connected between low-voltage auxiliary feeding circuit line A− and frame ground FG2. Attenuation circuit 67 is electrically connected between low-voltage auxiliary feeding circuit line A− and isolating element 57. The configuration of attenuation circuit 67 is also equivalent to the configuration of attenuation circuit 61 (see FIG. 3).

Isolating element 57 is electrically connected between attenuation circuit 67 and ECU 23. Isolating element 57 transmits, from attenuation circuit 67 to ECU 23, a signal from controller 13 while isolating attenuation circuit 67 on the primary side from ECU 23 on the secondary side. Isolating element 57 is also a digital isolator of capacitive coupling type or magnetic coupling type (see FIG. 4 or 5) equivalent to isolating element 51.

Resistor R3 is electrically connected between charging/discharging connector connection check line CC2 and frame ground FG2. Resistor R5 is a pull-up resistor that pulls up an electric potential of charging/discharging connector connection check line CC2 to an operating voltage U2 of auxiliary battery 22. Attenuation circuit 68 is electrically connected between charging/discharging connector connection check line CC2 and isolating element 58. The configuration of attenuation circuit 68 is also equivalent to the configuration of attenuation circuit 61 (see FIG. 3).

Isolating element 58 is electrically connected between attenuation circuit 68 and ECU 23. Isolating element 58 transmits, from attenuation circuit 68 to ECU 23, a signal for vehicle 2B to detect that charging/discharging connector 33B is connected to vehicle inlet 20B, while isolating attenuation circuit 68 on the primary side from ECU 23 on the secondary side. Isolating element 58 is also a digital isolator of capacitive coupling type or magnetic coupling type (see FIG. 4 or 5) equivalent to isolating element 51.

Resistor R1 is a pull-up resistor that pulls up an electric potential of charging/discharging connector connection check line CC1 to an operating voltage U1 of control power supply 12. Attenuation circuit 69 is electrically connected between charging/discharging connector connection check line CC1 and isolating element 59. The configuration of attenuation circuit 69 is also equivalent to the configuration of attenuation circuit 61 (see FIG. 3).

Isolating element 59 is electrically connected between attenuation circuit 69 and controller 13. Isolating element 59 transmits, from attenuation circuit 69 to controller 13, a signal for EVPS 1B to detect that charging/discharging connector 33B is connected to vehicle inlet 20B, while isolating attenuation circuit 69 on the primary side from controller 13 on the secondary side. Isolating element 59 is also a digital isolator of capacitive coupling type or magnetic coupling type (see FIG. 4 or 5) equivalent to isolating element 51.

As described above, control signal circuit 14B of EVPS 1B includes isolating element 59 also in Embodiment 2 as in Embodiment 1 and the variation thereof. Control signal circuit 24B of vehicle 2B includes isolating elements 56 to 58. Isolating elements 56 to 59, which are digital isolators of capacitive coupling type or magnetic coupling type, consume electric power only in transmission of a control signal. Also, a decrease in the current transfer ratio due to the degradation of the digital isolator needs not to be taken into consideration. Thus, Embodiment 2 can reduce power consumption of EVPS 1B and vehicle 2B while ensuring compatibility. Also, the end of life of the light emitting element of the photocoupler is not an issue.

Although both of EVPS 1B and vehicle 2B include an isolating element in the configuration example shown in FIG. 9, only one of EVPS 1B and vehicle 2B may include an isolating element and the other may include a photocoupler (not shown).

Switches K3, K4 correspond to the "third switch" and "fourth switch" according to the present disclosure, respectively. Low-voltage auxiliary feeding circuit lines A+, A− correspond to the "first low-voltage auxiliary feeding circuit line" and "second low-voltage auxiliary feeding circuit line" according to the present disclosure, respectively. Charging/discharging connector connection check line CC2 corresponds to a "first charging/discharging connector connection check line" according to the present disclosure. Charging/discharging connector connection check line CC1 corresponds to a "second charging/discharging connector connection check line" according to the present disclosure. Isolating elements 56 to 59 correspond to the "fifth isolating element" to "eighth isolating element" according to the present disclosure, respectively. Attenuation circuits 66 to 69 correspond to the "fourth attenuation circuit" to "seventh attenuation circuit" according to the present disclosure, respectively. Resistors R6, R7, R10, R3, R1 of FIG. 9 correspond to the "eighth resistor" to "twelfth resistor" according to the present disclosure, respectively.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle configured to perform charging/discharging between a power facility and the vehicle via a vehicle inlet, the vehicle comprising:
    a controller that controls charging/discharging of the vehicle; and
    a control signal circuit including at least one control signal line connected between the vehicle inlet and the controller,
    wherein the control signal circuit includes:
        a compatible circuit for ensuring compatibility of a control signal transmitted through the at least one control signal line between the power facility and the controller, and
        an isolating portion of capacitive coupling type or magnetic coupling type electrically isolating the compatible circuit from the controller,
    wherein the at least one control signal line includes:
        a first actuation start/stop line connected to a voltage level of a control power supply of the power facility via a first switch, and
        a second actuation start/stop line connected to ground via a second switch, and
    wherein the isolating portion includes:
        a first isolating element electrically connected to the first actuation start/stop line via the compatible circuit, and
        a second isolating element electrically connected to the second actuation start/stop line via the compatible circuit.

2. The vehicle according to claim 1, wherein each of the first isolating element and the second isolating element is a digital isolator configured to transmit an AC signal from a primary side to a secondary side of each isolating element while galvanically isolating the primary side from the secondary side.

3. The vehicle according to claim 1, wherein the compatible circuit includes
a first resistor electrically connected between the first actuation start/stop line and the second actuation start/stop line,
a second resistor electrically connected between the first actuation start/stop line and the ground,
a third resistor having a first end electrically connected to the first actuation start/stop line and a second end, and
a switch electrically connected between the second end of the third resistor and the ground and being turned on and off according to a voltage level of the second actuation start/stop line.

4. The vehicle according to claim 3, wherein
the switch includes a first transistor, and
the first transistor includes
a first terminal that is a collector or a drain electrically connected to the second end of the third resistor,
a second terminal that is an emitter or a source electrically connected to the ground, and
a third terminal that is a base or a gate electrically connected to the second actuation start/stop line, and
the compatible circuit further includes a fourth resistor electrically connected between the first terminal and the second terminal of the first transistor.

5. The vehicle according to claim 3, wherein the compatible circuit further includes
a first attenuation circuit electrically connected to the first actuation start/stop line, and
a second attenuation circuit electrically connected to the second actuation start/stop line via the first resistor and the third resistor.

6. The vehicle according to claim 1, wherein
the at least one control signal line includes a charging/discharging connector connection check line through which a control signal for checking connection of a charging/discharging connector to the vehicle inlet is transmitted, and
the isolating portion includes a third isolating element electrically connected to the charging/discharging connector connection check line via the compatible circuit.

7. The vehicle according to claim 6, wherein the compatible circuit further includes
a fifth resistor that pulls up an electric potential of the charging/discharging connector connection check line to a voltage of an auxiliary battery, and
a third attenuation circuit electrically connected to the charging/discharging connector connection check line.

8. The vehicle according to claim 1, wherein
the at least one control signal line includes an actuation permission/prohibition line through which a control signal for notifying permission or prohibition of charging/discharging of the vehicle is transmitted, and
the isolating portion incudes a fourth isolating element of capacitive coupling type or magnetic coupling type electrically connected to the actuation permission/prohibition line via the compatible circuit.

9. The vehicle according to claim 8, wherein
the compatible circuit includes a second transistor,
the second transistor has
a first terminal that is a collector or a drain,
a second terminal that is an emitter or a source electrically connected to ground, and
a third terminal that is a base or a gate, and
the compatible circuit further includes
a sixth resistor electrically connected between the actuation permission/prohibition line and the second terminal of the second transistor, and
a seventh resistor electrically connected between the third terminal of the second transistor and the fourth isolating element.

10. A power management system comprising:
the vehicle according to claim 8; and
the power facility,
wherein the power facility includes an isolating element of capacitive coupling type or magnetic coupling type connected to the actuation permission/prohibition line.

11. The vehicle according to claim 1, wherein
the at least one control signal line includes
a first low-voltage auxiliary feeding circuit line connected to a voltage level of an auxiliary power supply of the power facility via a third switch, and
a second low-voltage auxiliary feeding circuit line connected to the voltage level of the auxiliary power supply via a fourth switch, and
the isolating portion includes
a fifth isolating element electrically connected to the first low-voltage auxiliary feeding circuit line via the compatible circuit, and
a sixth isolating element electrically connected to the second low-voltage auxiliary feeding circuit line via the compatible circuit.

12. The vehicle according to claim 11, wherein the compatible circuit includes
an eighth resistor electrically connected between the first low-voltage auxiliary feeding circuit line and ground,
a fourth attenuation circuit electrically connected between the first low-voltage auxiliary feeding circuit line and the fifth isolating element,
a ninth resistor electrically connected between the second low-voltage auxiliary feeding circuit line and the ground, and
a fifth attenuation circuit electrically connected between the second low-voltage auxiliary feeding circuit line and the sixth isolating element.

13. The vehicle according to claim 11, wherein
the at least one control signal line includes a first charging/discharging connector connection check line through which a control signal for checking connection of a charging/discharging connector to the vehicle inlet is transmitted, and
the isolating portion includes a seventh isolating element electrically connected to the first charging/discharging connector connection check line via the compatible circuit.

14. The vehicle according to claim 13, wherein the compatible circuit further includes
a tenth resistor that pulls up an electric potential of the first charging/discharging connector connection check line to a voltage of an auxiliary battery,
an eleventh resistor electrically connected between the first charging/discharging connector connection check line and ground, and a sixth attenuation circuit electrically connected between the first charging/discharging connector connection check line and the seventh isolating element.

15. A power management system comprising:
the vehicle according to claim 13; and
the power facility, wherein
the at least one control signal line includes a second charging/discharging connector connection check line through which a control signal for checking connection of the charging/discharging connector to the vehicle inlet is transmitted, and
the power facility includes an eighth isolating element of capacitive coupling type or magnetic coupling type connected to the second charging/discharging connector connection check line via the compatible circuit.

16. The power management system according to claim 15, wherein the power facility further includes
a twelfth resistor that pulls up an electric potential of the second charging/discharging connector connection check line to a voltage of the auxiliary power supply, and
a seventh attenuation circuit electrically connected between the second charging/discharging connector connection check line and the eighth isolating element.

17. A vehicle configured to perform charging/discharging between a power facility and the vehicle via a vehicle inlet, the vehicle comprising:
a controller that controls charging/discharging of the vehicle; and
a control signal circuit including at least one control signal line connected between the vehicle inlet and the controller,
wherein the control signal circuit includes:
a compatible circuit for ensuring compatibility of a control signal transmitted through the at least one control signal line between the power facility and the controller, and
an isolating portion of capacitive coupling type or magnetic coupling type electrically isolating the compatible circuit from the controller,
wherein the at least one control signal line includes a charging/discharging connector connection check line through which a control signal for checking connection of a charging/discharging connector to the vehicle inlet is transmitted, and
wherein the isolating portion includes a third isolating element electrically connected to the charging/discharging connector connection check line via the compatible circuit.

18. The vehicle according to claim 17, wherein the compatible circuit further includes
a fifth resistor that pulls up an electric potential of the charging/discharging connector connection check line to a voltage of an auxiliary battery, and
a third attenuation circuit electrically connected to the charging/discharging connector connection check line.

19. A vehicle configured to perform charging/discharging between a power facility and the vehicle via a vehicle inlet, the vehicle comprising:
a controller that controls charging/discharging of the vehicle; and
a control signal circuit including at least one control signal line connected between the vehicle inlet and the controller,
wherein the control signal circuit includes:
a compatible circuit for ensuring compatibility of a control signal transmitted through the at least one control signal line between the power facility and the controller, and
an isolating portion of capacitive coupling type or magnetic coupling type electrically isolating the compatible circuit from the controller,
wherein the at least one control signal line includes an actuation permission/prohibition line through which a control signal for notifying permission or prohibition of charging/discharging of the vehicle is transmitted, and
wherein the isolating portion incudes a fourth isolating element of capacitive coupling type or magnetic coupling type electrically connected to the actuation permission/prohibition line via the compatible circuit.

20. The vehicle according to claim 19, wherein
the compatible circuit includes a second transistor,
the second transistor has
a first terminal that is a collector or a drain,
a second terminal that is an emitter or a source electrically connected to ground, and
a third terminal that is a base or a gate, and
the compatible circuit further includes
a sixth resistor electrically connected between the actuation permission/prohibition line and the second terminal of the second transistor, and
a seventh resistor electrically connected between the third terminal of the second transistor and the fourth isolating element.

* * * * *